H. G. Ellsworth,

Belt Fastener,

N° 10,692.    Patented Mar. 28, 1854.

UNITED STATES PATENT OFFICE.

H. G. ELLSWORTH, OF AUBURN, NEW YORK.

BELT-CLASP FOR MACHINERY.

Specification of Letters Patent No. 10,692, dated March 28, 1854.

*To all whom it may concern:*

Be it known that I, H. G. ELLSWORTH, of Auburn, New York, have invented a new and useful Improvement in the Method of Splicing and Uniting Belts, of which the following is a full, clear, and exact description, reference being had to the accompanying drawings, making part of this specification in which—

Figure 1:
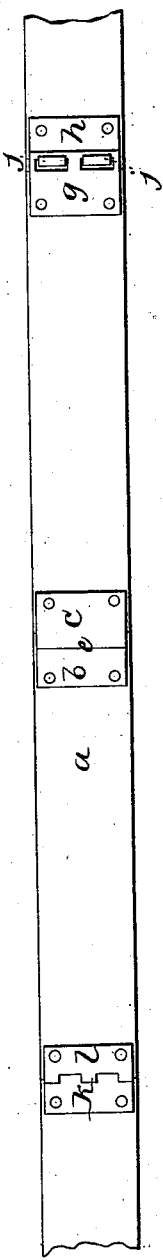
Figure 2:
Figure 3:

Figure 1, is a face view of a belt on my improved plan; Fig. 2, an edge view thereof; Fig. 3, a longitudinal section.

The same letters indicate like parts in all the figures.

The modes heretofore practiced are first, uniting the ends by means of leather thongs passing through holes in the two parts to be united; second, lapping the ends and riveting through the lap; and third, attaching hooks made of metal wire to one end and hooking them into holes made near the other end.

The objection to the first is the want of strength in the thongs which have to sustain the whole force of the pull on the belt. The thongs are liable to stretch, and they project to the extent of their thickness beyond the surface of the belt, causing injurious shocks and vibrations in passing over the pulleys or drums. And the leather is liable to tear out when the thongs pass through the holes.

The second is objectionable because of the lap which doubles the thickness of and causes a jar in passing over the pulleys or drums, and the objection to the third is the want of sufficient strength, and the difficulty of placing all the hooks in a line so that they shall pull equally. And all of them are objectionable because of the length of time required to unite a belt.

The nature of my invention, with the view to avoid the defects above enumerated, consists in splicing or uniting the ends of belts end to end, by means of metal plates riveted or otherwise secured to the outer surface of and near the ends of the belt, which plates are made to clasp and interlock to form the connection and keep the inner face of the belt smooth and even and free to bend around pulleys and drums, and be held together entirely by the union of the two part clasp, while the inner face of the belt which passes in contact with the pulleys or drums shall present a perfectly smooth and even surface.

In the accompanying drawings $a$ represents a leather belt united at three different points to represent three modifications of my invention.

The ends of the belt intended to be united are to be cut square so as to make a proper joint, and to the outer surface, at the ends, are secured, by rivets, two plates $b$, and $c$. The one $b$, does not project beyond the end of the belt, and is formed with a lip $d$, turned over. The other $c$, projects a short distance beyond its end of the belt. This plate where it projects beyond the end of the belt is turned up slightly, and then is formed with a lip $e$, the reverse on the lip of the other plate, and these two turned lips are hooked into each other as represented in the drawings and the one $b$, is provided with end flanches $f$, $f$, within which the lip $e$, of the plate $c$, fits to prevent lateral slip. Instead of this mode of forming the clasp, it may be formed of two plates $g$, and $h$, secured to the end of the belt as above described, the one $g$, having any desired number of mortices, and the other with hook formed lips $j$, $j$, which pass through the mortises and embrace the edge of the plate on the outer edge of the plate. Or instead of this it may be made of two plates $k$, $l$, secured in like manner to the belt, and connected together in the manner of a hinge with knuckle joints secured by hinge pins $m$, passing through the two.

In either of the modifications above described it will be seen that the ends of the belt come together square leaving the inner surface smooth and even so as to pass over pulleys and drums without jar or varying strain, while at the same time connection of the clasp plates permit the belt to adapt itself to the curvatures without undue strain, there being an equal pull or strain on every part of the entire width of the belt.

The plates can be made of any desirable strength without interfering with the pliability of the belt, and they can be secured to the belt by rivets in a manner to prevent injury to the leather.

I do not wish to limit myself to the special modes of construction of the plates above described, as these may be varied within the range of my invention.

What I claim as my invention and desire to secure by Letters Patent, is—

The method of uniting or splicing belts end to end by means of metal plates riveted or otherwise secured to the outer surface of, and near the ends of the belt, and clasping or interlocking in manner substantially as described, and for the purpose specified.

H. G. ELLSWORTH.

Witnesses:
    CHAS. D. MILLER,
    HORACE T. COOK.